C. TOLLE & C. WIRTH.
Harrow.

No. 198,710. Patented Dec. 25, 1877.

Witnesses:
J. W. Herthel
Chas. Herthel

Inventors
Charles Tolle
and Christian Wirth
per
Herthel & Co
Attys

UNITED STATES PATENT OFFICE.

CHARLES TOLLE AND CHRISTIAN WIRTH, OF GODFREY, ILLINOIS.

IMPROVEMENT IN HARROWS.

Specification forming part of Letters Patent No. 198,710, dated December 25, 1877; application filed October 5, 1877.

*To all whom it may concern:*

Be it known that we, CHARLES TOLLE and CHRISTIAN WIRTH, both of Godfrey, Madison county, and State of Illinois, have invented an Improved Harrow, of which the following is a specification:

The nature of our invention consists in the peculiar parts and their operation to achieve the results and advantages as will hereinafter appear.

Figure 1:
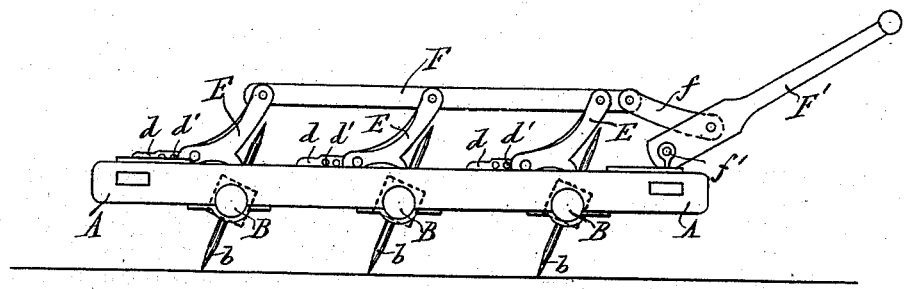
Figure 2:
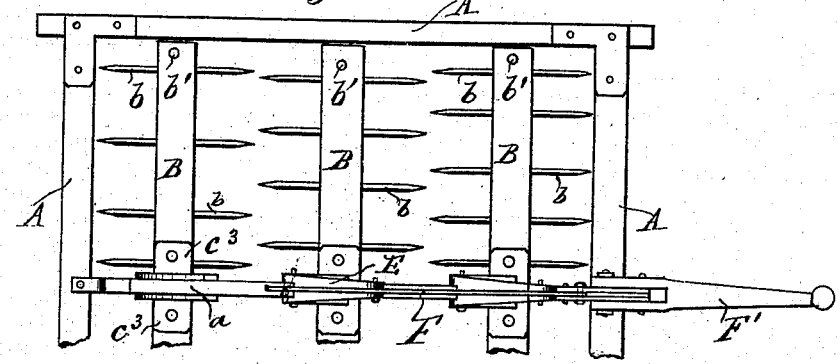
Figures 3, 4, 5:
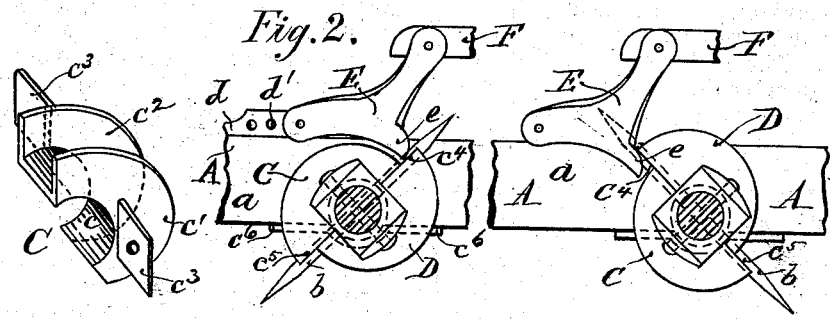

Of the drawings, Figure 1 is a side elevation. Fig. 2 is a top plan. Fig. 3 is a perspective view of one of our couplings. Figs. 4 and 5 are respective side elevations of the parts by means whereof the teeth can be adjustably secured in different inclinations.

A is the required frame, divided in the center by a longitudinal bar, A, said frame parts being to support the operating parts. B represent a series of turn-bars, arranged crosswise and properly journaled. Said turn-bars carry the harrow-teeth, our object being to achieve with our harrow the advantages of a rotary harrow. The series of teeth $b$ are secured in each turn-bar in such a way that said teeth shall have their sharpened points (both ends of the teeth) to project upward and downward, in order to penetrate the soil.

$b'$ are teeth passing through the turn-bars B near their ends, (see Fig. 2,) being set at right angles to the teeth $b$. When the teeth $b$ are being drawn out of the ground the teeth $b'$ catch into the ground, and revolve the turn-bars so that the opposite ends of the teeth $b$ will come into operation, and thus, both sets of teeth $b\ b'$ operating, produce a rotary harrow.

Our improvements more chiefly relate to the combination of the parts that enable the operator to adjust and secure the harrow-teeth in different positions required, and to adapt the same to operate in accordance with the nature of the soil, the seed or growth to be cultivated, and otherwise to suit the peculiar requirements of the case.

The said parts in their construction and operation are as follows: C and D represent duplicate couplings, the peculiar constructive shape of one, in its entirety, being shown in Fig. 3. Each coupling is a casting possessing these constructive features, viz., a semicircular bearing at $c$, the projecting eccentric sides $c^1\ c^2$, and the opposite lug-bearings $c^3$, all shown in Fig. 3. The bearing $c$ is to fit over the journal of each turn-bar. The eccentric sides $c^1\ c^2$ are the parts acted upon by the lever attachment, and as will hereinafter appear, and the lugs $c^3$ the parts that strengthen the joint of each coupling when secured to each turn-bar. The two duplicate couplings C and D are jointed to each turn-bar in the operative relationship shown in Figs. 2, 4, 5, and so that the eccentric sides $c^1\ c^2$ of each coupling shall present the opposite bearing-edge at $c^4\ c^5$. The operative position for each coupling C D is on each turn-bar immediately contiguous to the opposite faces of the dividing-bar $a$. (See Figs. 2, 4, 5.) The same bolt that passes through the lugs of the upper coupling also passes through the lugs of the lower coupling, thus securing both devices rigidly to the turn-bar, and so as to turn with same. The journaling of the lower coupling is further secured by a strap, $c^6$, which is passed between the sides $c^1\ c^2$ over the journal part $c$, both ends of said strap being properly bolted to the under side of the dividing-bar of the frame. Each turn-bar has, therefore, two couplings, C D. The respective four eccentric sides of both couplings project on the opposite sides of the dividing-bar $a$. (See Figs. 2, 4, 5.) This arrangement is for the purpose of combining said couplings with a lever attachment.

The lever attachment with which we provide the top of the frame is as follows: To the top of the dividing-bar $a$ we secure the respective fulcrum-bars $d$, each having a series of holes, $d'$. (See Figs. 1, 4, 5.) The fulcrum for the respective trip-levers can be changed from one hole, $d'$, to another. E are the trip-levers, of the constructive shape indicated in the drawing, so that each can be pivoted to the fulcrum-bars, said levers having the stops at $e$, and by their upright arm can be pivoted to a horizontal bar, F. (See Figs. 1, 2, 4, 5.) The bar F extends to the rear of the harrow, and by pivotal connection with an arm, $f$, is operated by the hand-lever F', having its fulcrum at $f'$. (See Fig. 1.) Each of the trip-levers E in arrangement can thus, by means of the parts F', f, and F, be operated so that the stops e shall engage or be disengaged from the bearing-edges $c^4$ $c^5$ of the couplings.

The operation of our improved harrow is as follows: When used as a rotary harrow, (in which case the turn-bars with the teeth continually revolve in the act of harrowing,) the trip-levers E are kept out of engagement from the eccentric sides of each coupling. The operator can further adjust and secure the teeth in three different positions, according to the nature of the work it is desired the harrow should perform. Thus the teeth can be set at an inclination, (see Figs. 1 and 4,) so as to harrow deep and reach, break, and level the lumps and heavier clods. For this purpose, suit the fulcrum of each trip-lever so that the stops e shall hold fast the couplings and prevent the turn-bars from revolving. It can be here stated that in case the teeth that penetrate the soil become clogged by weeds, rubbish, &c., that the operator needs only to cause each trip-lever to let go its hold on the couplings in order to permit the turn-bars to revolve so as to bring the opposite points of the teeth into play or action. In the very act of revolving (by the force of the draft and the action of the teeth passing up through the soil) the teeth are freed from their accumulations. In like manner the operator disengages the trip-levers from the couplings, to permit the teeth to pass over stumps or obstructions. When the teeth are set and held in a vertical position, our harrow can perform the work of all ordinary harrows in breaking, stirring, and leveling the soil, destroying weeds, &c. When the teeth are set and held in the inclination shown in Fig. 5, the act of harrowing is easy for the draft-team. The teeth then smooth, level, and free the soil, and the harrowing can be done best for covering the seed, especially cultivating corn, clover-seed, &c. We can, therefore, harrow deep, shallow, or smooth the soil, and, as is apparent, the changes of position for the teeth necessitate a change of fulcrum for the trip-levers, and when this is first done the operation to cause each trip-lever to catch hold or let go the couplings is done simultaneously by the operation of the hand-lever.

What we claim is—

1. The fulcrum-bar $d$, having adjusting-holes $d'$, the trip-lever E, having stops $e$, in combination with the bearing-edges $c^4$ $c^5$ of the couplings C and D, to operate as and for the purpose set forth.

2. The combination of the lever-arm and rod-connections with trip-levers E, fulcrum-bars $d$, having adjusting-holes $d'$, couplings C and D, with the frame and turn-bars of a harrow, all constructed to operate in the manner and for the purpose set forth.

In testimony of said invention we have hereunto set our hands.

CHARLES TOLLE.
CHRISTIAN WIRTH.

Witnesses:
BENJ. WEBSTER,
F. SMITH.